United States Patent
Ohashi et al.

(10) Patent No.: US 9,355,752 B2
(45) Date of Patent: May 31, 2016

(54) IRRADIATION FIELD-LIMITING APPARATUS, X-RAY-GENERATING UNIT INCLUDING THE IRRADIATION FIELD-LIMITING APPARATUS, AND X-RAY RADIOGRAPHY SYSTEM INCLUDING THE IRRADIATION FIELD-LIMITING APPARATUS

(71) Applicant: CANON KABUSHIKI KAISHA, Tokyo (JP)

(72) Inventors: Yasuo Ohashi, Kawasaki (JP); Takashi Shiozawa, Tokyo (JP); Kazuyuki Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 14/330,975

(22) Filed: Jul. 14, 2014

(65) Prior Publication Data

US 2015/0023469 A1     Jan. 22, 2015

(30) Foreign Application Priority Data

Jul. 16, 2013 (JP) ................................. 2013-147312
Jun. 6, 2014 (JP) ................................. 2014-117279

(51) Int. Cl.
*G21K 1/04* (2006.01)
*H05G 1/02* (2006.01)
*G01J 1/04* (2006.01)

(52) U.S. Cl.
CPC ........ *G21K 1/046* (2013.01); *G21K 1/04* (2013.01); *H05G 1/02* (2013.01); *G01J 1/0462* (2013.01)

(58) Field of Classification Search
CPC ........... G21K 1/02; G21K 1/04; G21K 1/046; A61B 6/06; A61B 6/08
USPC ...................... 378/147, 150, 151, 152, 153
See application file for complete search history.

(56) References Cited

U.S. PATENT DOCUMENTS

| | | |
|---|---|---|
| 4,246,488 A | 1/1981 | Hura |
| 2002/0126799 A1 | 9/2002 | Saladin |
| 2004/0234034 A1 | 11/2004 | Godzinsky |
| 2005/0152499 A1 | 7/2005 | Zhao |
| 2005/0191047 A1 | 9/2005 | Toji |

FOREIGN PATENT DOCUMENTS

| | | |
|---|---|---|
| GB | 114941 A | 4/1918 |
| JP | 2007-020869 A | 2/2007 |
| JP | 2011-072369 A | 4/2011 |

*Primary Examiner* — Jurie Yun
(74) *Attorney, Agent, or Firm* — Canon U.S.A., Inc., IP Division

(57) ABSTRACT

An irradiation field-limiting apparatus connected to an X-ray-generating apparatus includes a pair of first limiting blades defining a width of an opening through which radiation is to pass; a first opening width-adjusting mechanism including a first opening width-adjusting shaft operable to adjust the width of the opening by moving the pair of first limiting blades toward or away from each other; and a first opening center-adjusting mechanism including a first opening center-adjusting shaft operable to adjust a center position of the opening by moving the pair of first limiting blades in a same direction. The first opening width-adjusting shaft and the first opening center-adjusting shaft are coaxially arranged.

19 Claims, 7 Drawing Sheets

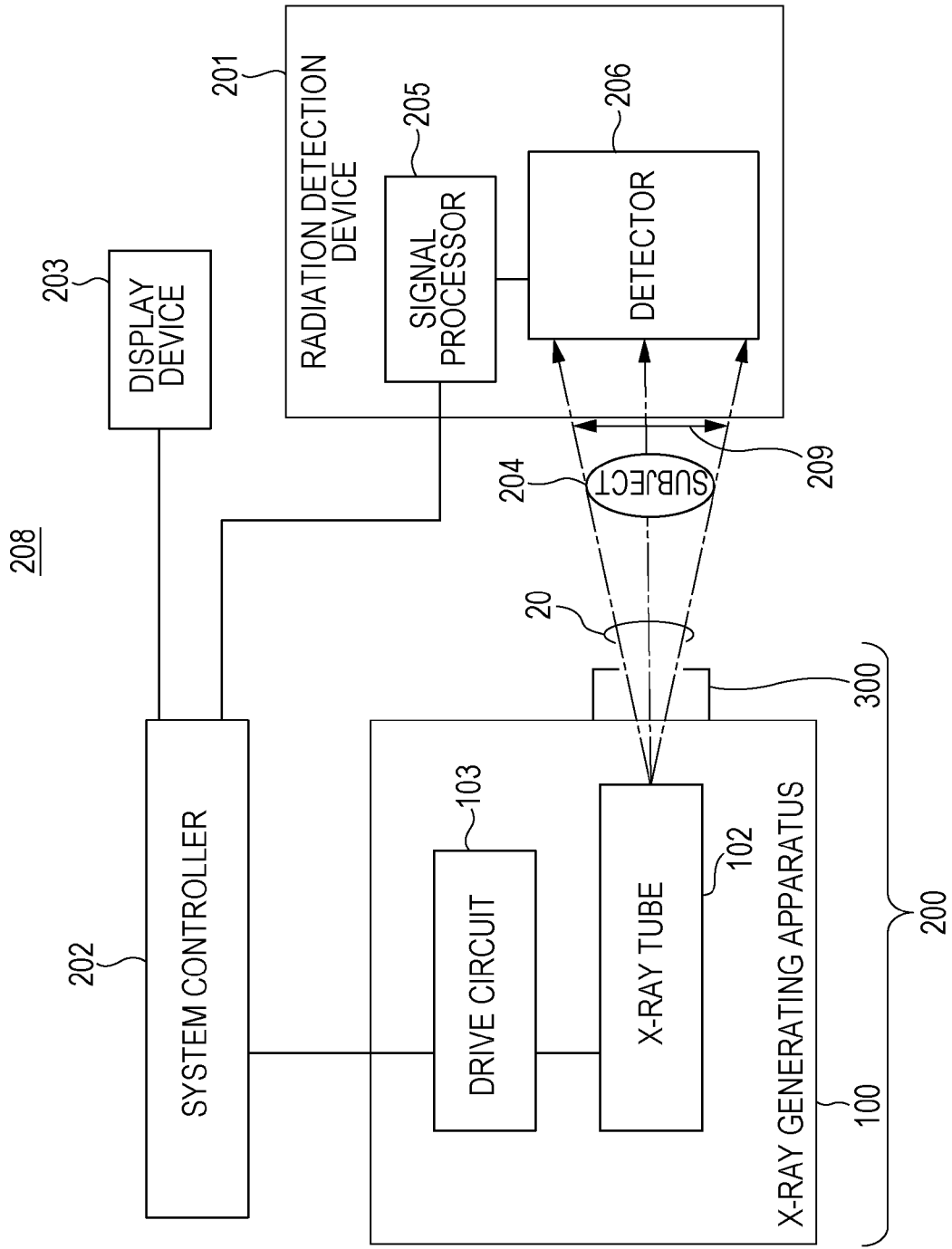

IRRADIATION FIELD-LIMITING APPARATUS, X-RAY-GENERATING UNIT INCLUDING THE IRRADIATION FIELD-LIMITING APPARATUS, AND X-RAY RADIOGRAPHY SYSTEM INCLUDING THE IRRADIATION FIELD-LIMITING APPARATUS

BACKGROUND OF THE INVENTION

1. Field of the Invention

The present invention relates to an irradiation field-limiting apparatus arranged on an X-ray extraction window of an X-ray-generating apparatus to limit an X-ray irradiation field, an X-ray-generating unit including the irradiation field-limiting apparatus, and an X-ray radiography system including the irradiation field-limiting apparatus.

2. Description of the Related Art

A radiography system described in Japanese Patent Laid-Open No. 2007-20869 includes a translation mechanism which moves an X-ray tube in a direction parallel to an X-ray detection plane of an X-ray detection device together with a collimator. In an X-ray radiography system described in Japanese Patent Laid-Open No. 2007-20869, the position of an X-ray irradiation field can be adjusted by the translation mechanism.

An X-ray radiography system described in Japanese Patent Laid-Open No. 2011-72369 includes an irradiation field-limiting apparatus which includes two pairs of limiting blades and which is configured such that the two pairs of limiting blades are moved in two orthogonal directions.

SUMMARY OF THE INVENTION

With the X-ray radiography system having the structure described in Japanese Patent Laid-Open No. 2007-20869, since the position of the X-ray irradiation field is adjusted by moving the X-ray-generating apparatus, the position adjustment can be performed without affecting the adjustment of the size of the X-ray irradiation field. However, since the entirety of the X-ray-generating apparatus, which is heavy, is moved, the support member receives a large force when the center of gravity is shifted in response to the movement of the X-ray-generating apparatus. Therefore, in the case where this configuration is applied to an X-ray radiography system including a portable X-ray-generating apparatus, since a support member with low rigidity is used to reduce the weight, vibration is generated when the center of gravity is shifted as a result of the movement of the X-ray-generating apparatus, and image blurring easily occurs.

With the irradiation field-limiting apparatus according to Japanese Patent Laid-Open No. 2011-72369, the size and position of the X-ray irradiation field can be adjusted by adjusting the position of each limiting blade. Therefore, the size and position of the X-ray irradiation field can be adjusted without moving the entirety of the heavy X-ray-generating apparatus. However, the positions of the four limiting blades need to be individually adjusted to set the X-ray irradiation field to a predetermined size at a predetermined position, and the apparatus is not sufficiently easy to operate.

The present invention provides a user-friendly system with which the size and position of an X-ray irradiation field can be readily adjusted without moving an X-ray-generating apparatus.

An irradiation field-limiting apparatus for limiting an irradiation field according to an aspect of the present invention includes a pair of first limiting blades defining a width of an opening through which radiation is to pass; a first opening width-adjusting mechanism including a first opening width-adjusting shaft operable to adjust the width of the opening by moving the pair of first limiting blades toward or away from each other; and a first opening center-adjusting mechanism including a first opening center-adjusting shaft operable to adjust a center position of the opening by moving the pair of first limiting blades in a same direction. The first opening width-adjusting shaft and the first opening center-adjusting shaft are coaxially arranged.

An X-ray generating unit according to another aspect of the present invention includes an X-ray-generating apparatus having an emission window out of which X-rays are emitted; and the irradiation field-limiting apparatus. The irradiation field-limiting apparatus is arranged on the outside of the emission window.

An X-ray radiography system according to another aspect of the present invention includes the X-ray-generating unit; an X-ray detection device for detecting an X-ray flux that has been emitted from the X-ray-generating unit and has passed through a subject; and a controller for controlling the X-ray-generating unit and the X-ray detection device in association with each other.

Further features of the present invention will become apparent from the following description of exemplary embodiments with reference to the attached drawings.

BRIEF DESCRIPTION OF THE DRAWINGS

FIG. 7 illustrates an X-ray radiography system according to an embodiment of the present invention.

DESCRIPTION OF THE EMBODIMENTS

Figure 1:
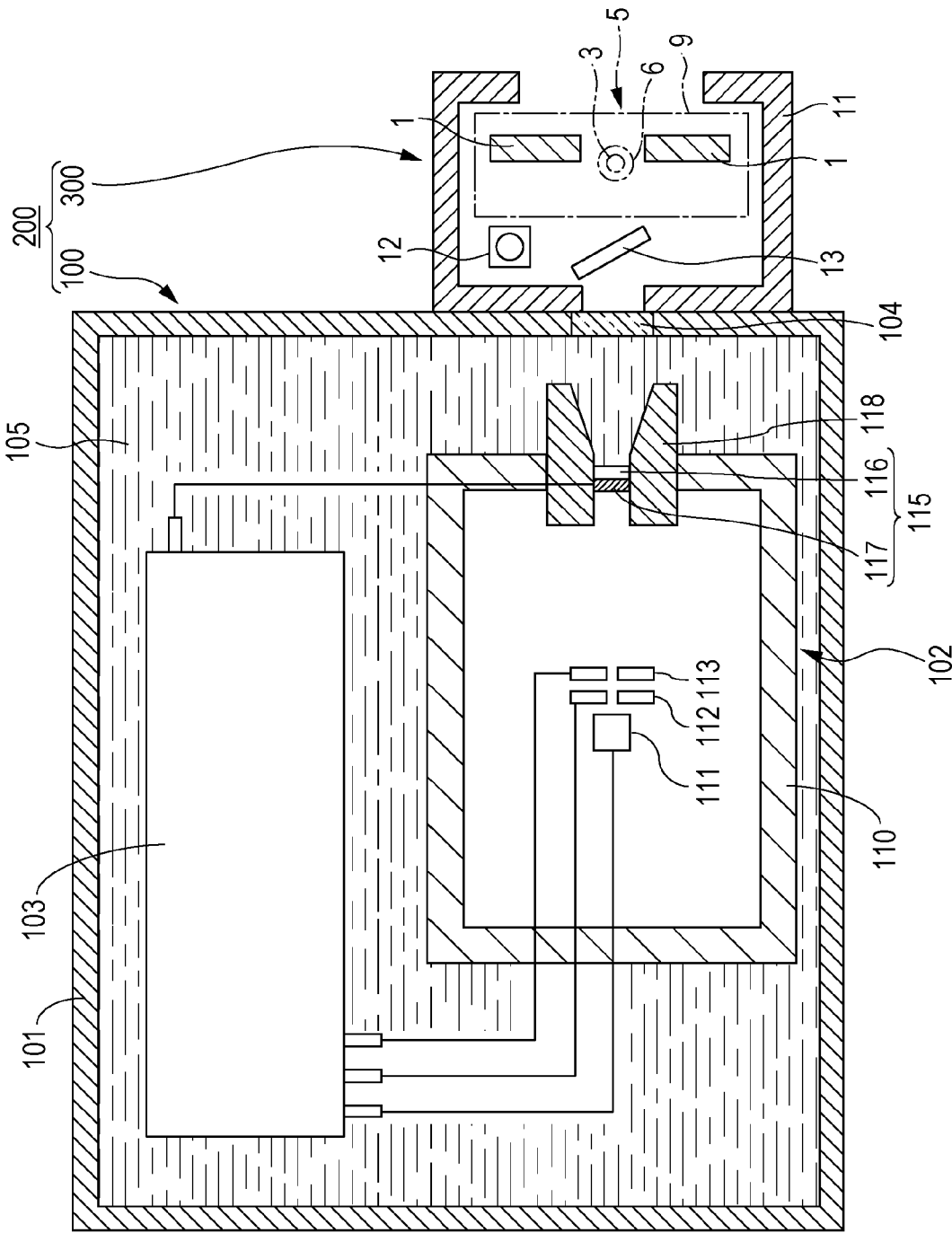
FIG. 1 is a schematic diagram illustrating the structure of an X-ray-generating unit including an irradiation field-limiting apparatus according to an embodiment of the present invention.

Embodiments of the present invention will now be described with reference to the accompanying drawings. In the drawings, the same reference numerals denote similar components. The dimensions, materials, shapes, positional relationships, etc., illustrated in the embodiments are not intended to limit the scope of the present invention.

An irradiation field-limiting apparatus and an X-ray-generating unit including the irradiation field-limiting apparatus according to an embodiment of the present invention will be described with reference to FIGS. 1 to 5.

According to the embodiment of the present invention, an X-ray-generating unit 200 includes an X-ray-generating apparatus 100 and an irradiation field-limiting apparatus 300.

First, the X-ray-generating apparatus 100 will be described. The X-ray-generating apparatus 100 may have a known structure. The X-ray-generating apparatus 100 includes a container 101, an X-ray tube 102, and an X-ray drive circuit 103. The X-ray tube 102 and the X-ray drive circuit 103 are contained in the container 101. The container 101 is made of a metal capable of blocking X-rays, and has an emission window 104 through which X-rays emitted from the X-ray tube 102 contained in the container 101 are emitted to the outside. The container 101 is filled with insulating liquid 105, which serves as medium for cooling the X-ray tube 102.

The X-ray tube 102 includes a cathode 111, which is an electron emission source, a grid electrode 112, and a lens electrode 113, all of which are contained in a vacuum chamber 110. A target 115 is arranged so as to oppose the cathode 111. The X-ray tube 102 of this embodiment is a transmissive X-ray tube, and has a transmission window through which the target 115 emits X-rays to the outside of the vacuum chamber 110.

The target 115 includes a support substrate 116 and a target layer 117 stacked on the support substrate 116. The support substrate 116 is made of a material with high X-ray permeability. For example, the support substrate 116 may be a diamond substrate. The target layer 117 is made of a material that emits X-rays when irradiated with electrons. The target layer 117 may be formed of a layer made of, or containing, a metal with an atomic number of 42 or more, so that X-rays can be efficiently generated. More specifically, tungsten, tantalum, molybdenum, etc., may be used. The target 115 is arranged such that the target layer 117 faces the cathode 111. The X-rays are generated by irradiating the target layer 117 with electrons that have been extracted from the cathode 111 and accelerated by the grid electrode 112, and converged by the lens electrode 113. The generated X-rays pass through the support substrate 116 and are emitted to the outside of the vacuum chamber 110.

Although the X-ray tube 102 is a transmissive X-ray tube, a reflective X-ray tube may instead be used as the X-ray tube 102 included in the X-ray-generating unit 200 according to the embodiment of the present invention. However, when a transmissive X-ray tube is used, X-rays with small variation in dose and quality of radiation due to the heel effect, which occurs in reflective X-ray tubes, can be obtained. Therefore, a transmissive X-ray tube is preferably used as the X-ray tube 102 because an X-ray irradiation field with small variation in dose and quality of radiation can be obtained even when the opening center position is adjusted by an opening center adjustment process, which will be described below.

An anode member 118, which projects toward the inside and outside of the vacuum chamber 110, is attached to the vacuum chamber 110. The anode member 118 is electrically connected to the target layer 117, and defines the anode potential of the target 115. The anode member 118 is connected to the support substrate 116, and holds the target 115. In the case where the support substrate 116 is formed of a member that transmits X-rays, the anode member 118 functions as a window that allows the X-rays to pass therethrough. The anode member 118 contains a material with low X-ray permeability, such as lead or tungsten, so that the emission angle of the X-rays can be limited and generation of backward scattered electrons can be regulated. The anode member 118 has a through-hole, and the target 115 is disposed in the through hole in the anode member 118. The through hole in the anode member 118 is divided by the target 115, which is at the intermediate position of the through-hole, into an electron reception hole, which is closer to the inside of the vacuum chamber 110, and an X-ray emission hole, which is closer to the outside of the vacuum chamber 110. The electron reception hole allows the target layer 117 to be irradiated with electrons, and faces the cathode 111. The X-ray emission hole allows the X-rays generated as a result of the irradiation of the target layer 117 with electrons to be emitted to the outside, and faces the emission window 104 of the container 101. The diameter of the X-ray emission hole gradually increases toward the emission window 104.

The drive circuit 103 is disposed in the container 101 of the X-ray-generating apparatus 100. Voltages are generated by the drive circuit 103, and are applied to the cathode 111, the grid electrode 112, and the lens electrode 113 of the X-ray tube 102, and to the target layer 117. A hot cathode, such as a tungsten filament or an impregnated cathode, or a cold cathode, such as a carbon nanotube, is used as the cathode 111. The electric field formed by the grid electrode 112 in the vacuum chamber 110 causes electrons to be emitted toward the target layer 117, whose potential is set to the anode potential. The electrons are converged by the lens electrode 113, and strike the target layer 117, which is fixed to the support substrate 116 by, for example, deposition, so that the X-rays are emitted. Some of unnecessary X-rays are blocked by the anode member 118, while some of a remaining X-rays pass through the emission window 104. Then, the X-rays travel through the irradiation field-limiting apparatus 300, and reach a predetermined X-ray irradiation field.

The insulating liquid 105 which fills the container 101 and serves as a cooling medium for the X-ray tube 102 may be electrical insulation oil, more specifically, mineral oil or silicone oil. Another example of the insulating liquid 105 is a fluorine-based electrically insulating liquid.

The irradiation field-limiting apparatus 300 according to the embodiment of the present invention will now be described with reference to FIGS. 1 and 2. The irradiation field limiting apparatus 300 is connected to the emission window 104 of the X-ray-generating apparatus 100, and limits the irradiation field of the X-rays emitted from the emission window 104 to a predetermined X-ray irradiation field. The irradiation field-limiting apparatus 300 according to the present embodiment blocks some of the radially emitted X-rays so that the X-rays are not emitted in unnecessary directions. For this purpose, the irradiation field-limiting apparatus 300 includes an enclosure 11, and a pair of limiting blades 1, a light source 12 of visible light, and a reflection mirror 13, which are disposed in the enclosure 11. As will be described below, the pair of limiting blades 1 and an opening width-adjusting mechanism 17, which can be operated by rotating an opening width-adjusting shaft 3, form a limiting-blade unit 5.

To define the X-ray irradiation field, the pair of limiting blades 1 limits the width of an opening through which the X-rays pass. The pair of limiting blades 1 is made of a material with low X-ray permeability, and is arranged such that end faces 24 of each limiting blade 1 face each other. The limiting blades 1 are connected to the opening width-adjusting shaft 3, so that they are movable toward and away from each other when the opening width-adjusting shaft 3 is rotated. In other words, the limiting blades 1 are connected to the opening width-adjusting shaft 3, so that they are movable in anti-parallel directions with respect to each other when the opening width-adjusting shaft 3 is rotated. The opening width-adjusting mechanism 17 includes at least the pair of limiting blades 1 and the opening width-adjusting shaft 3.

Figure 2:
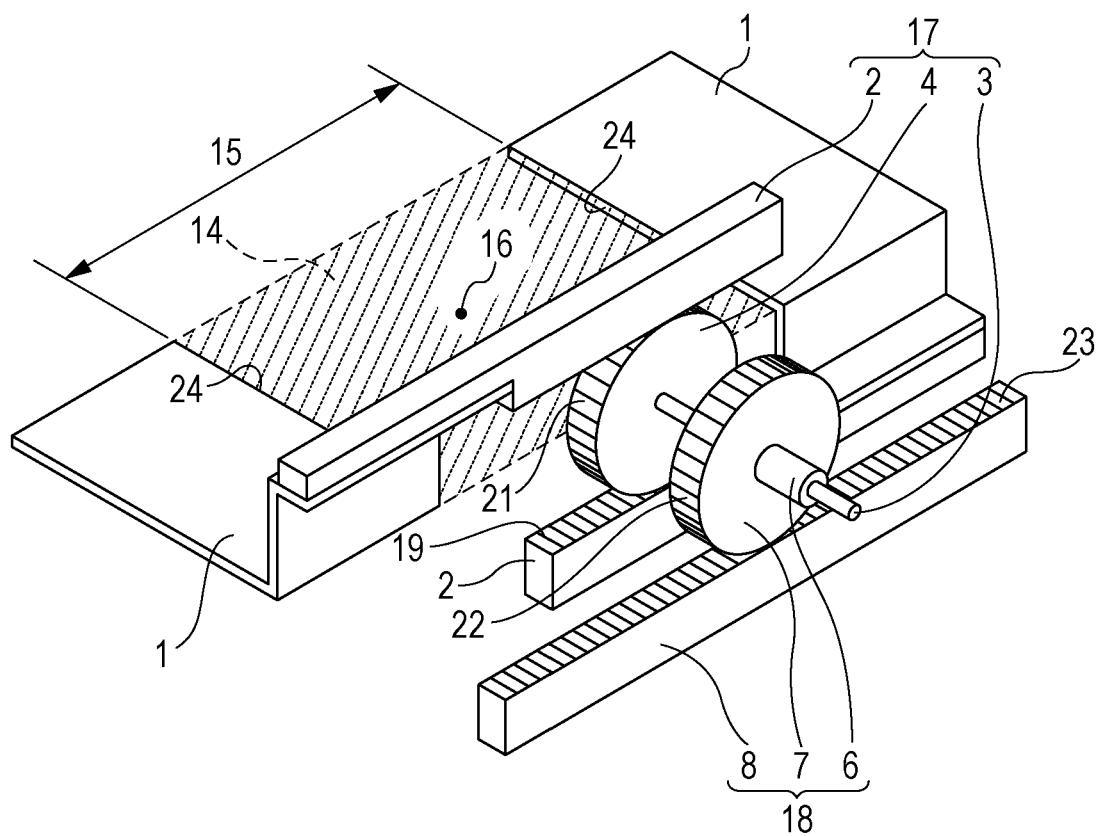
FIG. 2 illustrates an embodiment of an opening width-adjusting mechanism and an opening center-adjusting mechanism.
Figure 3:
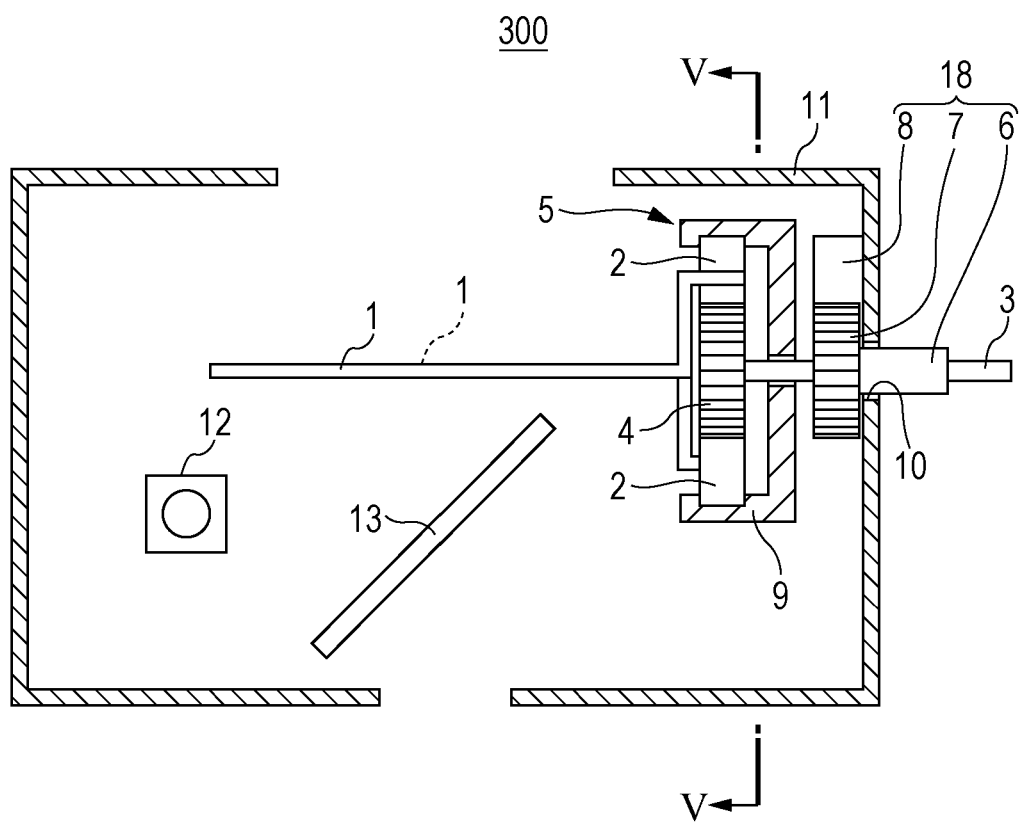
FIG. 3 is a sectional view of the irradiation field limiting-apparatus according to the embodiment of the present invention.

The opening width-adjusting mechanism 17 illustrated in FIGS. 2 and 3 includes a pair of opening width-adjusting rack gears 2 and an opening width-adjusting pinion 4. According to the present embodiment, the two limiting blades 1 are attached to respective opening width-adjusting rack gears 2. The two opening width-adjusting rack gears 2 are arranged such that their respective gear faces 19 face each other. The opening width-adjusting pinion 4 also having a gear face 21 is sandwiched between the pair of opening width-adjusting rack gears 2.

The opening width-adjusting rack gears 2 are configured to be movable in directions parallel to an opening width 15 defined by the pair of limiting blades 1. When the opening width-adjusting shaft 3 is rotated in one direction to rotate the opening-width adjusting pinion 4, the opening width-adjusting rack gears 2 move in anti-parallel directions with respect to each other. In response to the movement of the pair of opening width-adjusting rack gears 2, the two limiting blades 1 move toward or away from each other. Thus, the opening width 15 can be adjusted.

Figure 5:
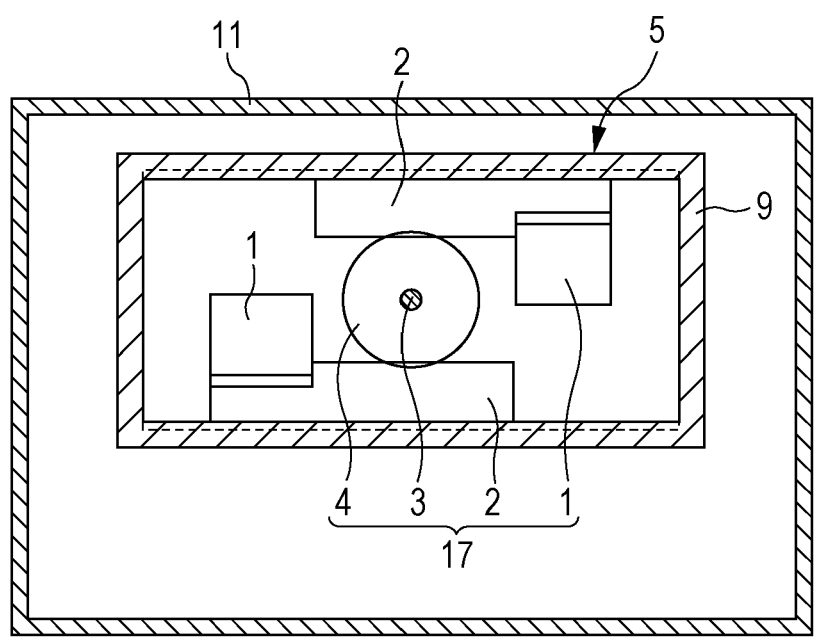
FIG. 5 is a sectional view of FIG. 3 taken along line V-V.

Referring to FIGS. 3 and 5, the pair of opening width-adjusting rack gears 2, to which the pair of limiting blades 1 are attached, are held by an inner casing 9 in a movable manner. The opening width-adjusting shaft 3, which has the opening width-adjusting pinion 4 attached thereto at an inner end thereof, is rotatably held by the inner casing 9. Thus, the opening width-adjusting mechanism 17, which includes the pair of opening width-adjusting rack gears 2 and the opening width-adjusting pinion 4 and which is operated by the opening width-adjusting shaft 3, is held by the inner casing 9 and forms the limiting-blade unit 5, the entirety of which is movable, together with the pair of limiting blades 1.

The inner casing 9 is held in the enclosure 11 such that the inner casing 9 is movable in a direction parallel to the movement direction of the pair of limiting blades 1. By moving the inner casing 9, the limiting-blade unit 5 can be moved in the direction parallel to the movement direction of the pair of limiting blades 1. Also, the position of a center 16 of the opening can be shifted without changing the opening width 15 defined by the pair of limiting blades 1, and the position of the X-ray irradiation field can be moved. Assuming a plate having the same size and shape as those of an opening 14 and constant thickness and density, the opening center 16 corresponds to the center of gravity of the plate. When the opening 14 (see FIG. 2) corresponds to a finite region on a single plane, the opening center 16 corresponds to the centroid of the finite region.

The inner casing 9 is moved—in other words, the limiting-blade unit 5 and thus the opening's center 16 is moved—by an opening center-adjusting mechanism 18. In the present embodiment, the opening center-adjusting mechanism 18 includes a pinion 7 which can be rotated by a shaft 6, and a rack gear 8 which meshes with the pinion 7.

Figure 4:
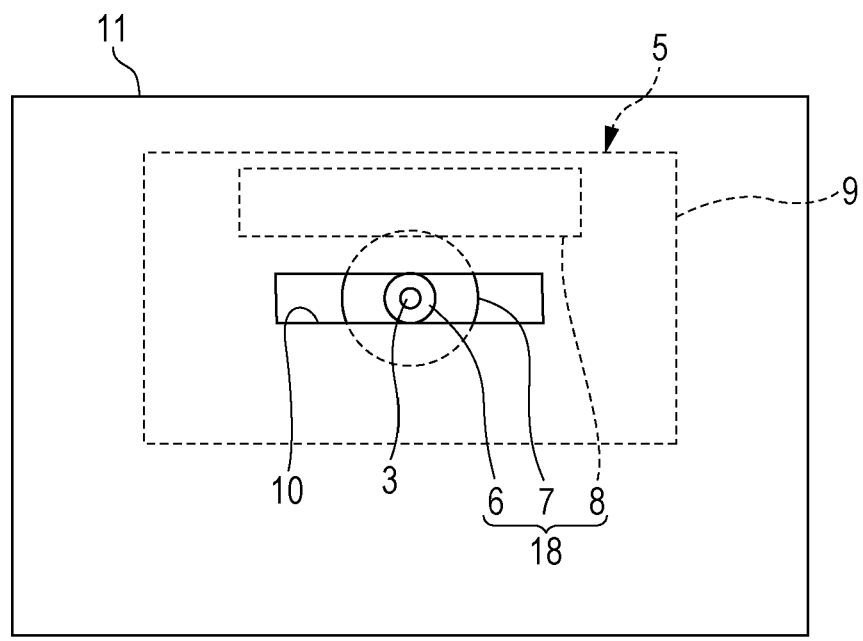
FIG. 4 is a right side view of the irradiation field-limiting apparatus illustrated in FIG. 3.

The opening center-adjusting shaft 6 is arranged coaxially with the opening width-adjusting shaft 3. The opening center-adjusting shaft 6 and the opening width-adjusting shaft 3 are configured to be rotatable about the same rotation axis in both forward and reverse directions. The opening center-adjusting pinion 7 is attached to the opening center-adjusting shaft 6. The opening center-adjusting pinion 7 has a gear face 22 that meshes with the gear face 23 of the opening center-adjusting rack gear 8. The opening center-adjusting rack gear 8 extends in the direction parallel to the movement direction of the pair of limiting blades 1, and is fixed to the enclosure 11. As illustrated in FIGS. 3 and 4, the opening width-adjusting shaft 3 and the opening center-adjusting shaft 6 extend through a guide slot 10, and the outer ends of the shafts project in a direction away from the opening 14 of the enclosure 11. The guide slot 10 extends in the direction parallel to the movement direction of the pair of limiting blades 1. The opening center-adjusting shaft 6 is disposed around the opening width-adjusting shaft 3 and the outer end of the opening width-adjusting shaft 3 projects further away from the opening 14 than the outer end of the opening center-adjusting shaft 6. When the opening center-adjusting shaft 6 is rotated in one direction, the opening center-adjusting pinion 7 rotates and moves along the opening center-adjusting rack gear 8. Also, the opening center-adjusting shaft 6 moves along the guide slot 10 together with the opening width-adjusting shaft 3. Consequently, the inner casing 9 is moved, so that the limiting-blade unit 5 is moved in the direction parallel to the movement direction of the pair of limiting blades 1. With the above-described coaxial arrangement, the opening-center adjustment, in which large inertial weight is connected to the adjusting shaft, can be performed by rotating the opening-center adjusting shaft 6, which is disposed on the outer side of the coaxial arrangement and has a large diameter. Therefore, resistance generated in the adjustment process can be reduced and the ease of operation can be increased.

In FIG. 3, the opening center-adjusting rack gear 8 is disposed in the enclosure 11. However, the opening center-adjusting rack gear 8 may instead be formed as a gear that extends along an edge of the guide slot 10. When the inner casing 9 is arranged so as to cover the inner side of the guide slot 10, leakage of the X-rays through the guide slot 10 can be reduced.

When the opening width-adjusting mechanism 17 and the opening center-adjusting mechanism 18 are constructed by using rack gears and pinions as described above, the structure of the irradiation field limiting apparatus 300 can be relatively simple.

The opening width-adjusting shaft 3 and the opening center-adjusting shaft 6 may either be rotated by a driving force of a motor or the like, or they may be operated manually. Manual operation of the opening center-adjusting shaft 6 is favorable in terms of the radiographic quality and ease of operation. With regard to the radiographic quality, the weight of the X-ray-generating unit can be reduced. With regard to the ease of operation, in a radiation-generating unit including a reference projection device, which will be described below, the operator can quickly adjust the positional relationship between the object and the imaging range while viewing a reference formed by visible light. In manual operation, the ease of operation can be increased if the amount by which the pair of limiting blades 1 is moved when the opening width-adjusting pinion 4 is rotated by a predetermined angle is close to the amount by which the limiting-blade unit 5 is moved when the opening center-adjusting pinion 7 is rotated by the predetermined angle. More specifically, the ratio between the amounts of movement may be in the range of 1:3 to 3:1, and preferably, the amounts of movement are the same.

When, as illustrated in FIGS. 2 and 3, the opening center-adjusting shaft 6 is disposed around the opening width-adjusting shaft 3 and the outer end of the opening width-adjusting shaft 3 projects further away from the opening 14 than the outer end of the opening center-adjusting shaft 6, the arrangement of adjusting knobs of the respective shafts can be relatively simple. The adjusting knobs may be arranged coaxially next to each other. In such a case, the operator can carry out the adjustment of the opening width 15 by the movement of the pair of limiting blades 1 and the adjustment of the opening center by the movement of the limiting-blade unit 5 without moving his or her hand and fingers by a large amount, and the adjustments can be performed quickly and readily.

Although a single pair of limiting blades 1 are illustrated in FIG. 2, the embodiment of the present invention also includes a modification in which a plurality of pairs of limiting blades are arranged in the travelling direction of the X-rays such that directions in which the opening width 15 is defined by the pairs of limiting blades cross each other (i.e. are in different directions including, for example, orthogonal). With this arrangement, the shape of the X-ray irradiation field can be changed. When two pairs of limiting blades are arranged such that the opening width can be changed in two orthogonal directions, a rectangular X-ray irradiation field having a variable aspect ratio can be formed. In this case, since two opening center-adjusting shafts 6 are arranged coaxially with respective opening width-adjusting shafts 3, the opening center 16 can be two-dimensionally moved within a plane including the opening 14.

The irradiation field-limiting apparatus 300 according to the present embodiment includes a reference projection device which displays a simulated X-ray irradiation field with visible light. The reference projection device includes the light source 12 which emits the visible light and the reflection mirror 13 which transmits the X-rays and reflects the visible light. The reflection mirror 13 is obliquely arranged in front of the emission window 104 of the X-ray-generating apparatus 100 with a reflective surface thereof facing the pair of limiting blades 1, so that the visible light emitted from the light source 12 can be emitted to the outside through the opening between the pair of limiting blades 1. The light source 12 is disposed so that the light source 12 and the point at which the X-rays are generated in the X-ray tube 102, more specifically, an X-ray focal point, which is the center point of the region in which the target 115 is irradiated with electrons, are symmetric with respect to the reflective surface of the reflection mirror 13. In other words, the light source 12 is located so as to be conjugate to the X-ray focal point. With this arrangement of the light source 12 and the reflection mirror 13, the visible light emitted from the light source 12, once reflected by the reflection mirror 13, travels along the same path as the path of the X-rays and forms a visible-light irradiation field. The light source 12 is not particularly limited as long as sufficiently bright visible light can be generated. The light source 12 may be, for example, a light emitting diode, and the size thereof can be easily made small in such a case.

Figure 6A:
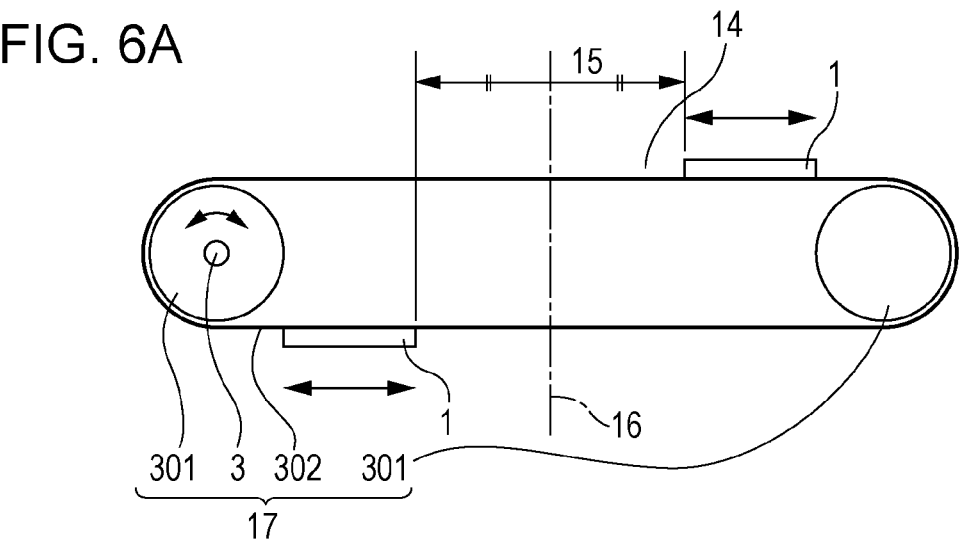
FIGS. 6A, 6B, and 6C respectively illustrate second, third, and fourth embodiments of the opening width-adjusting mechanism.
Figure 6B:
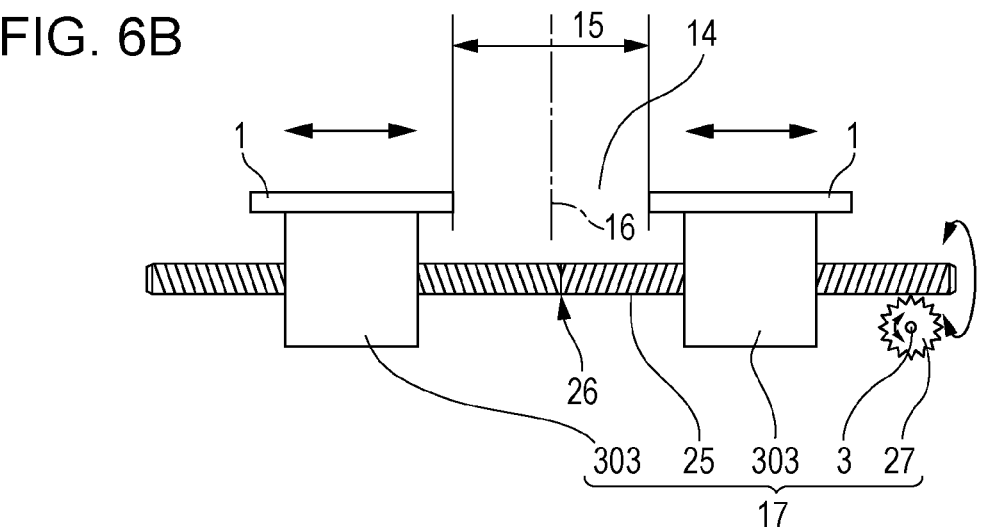
Figure 6C:
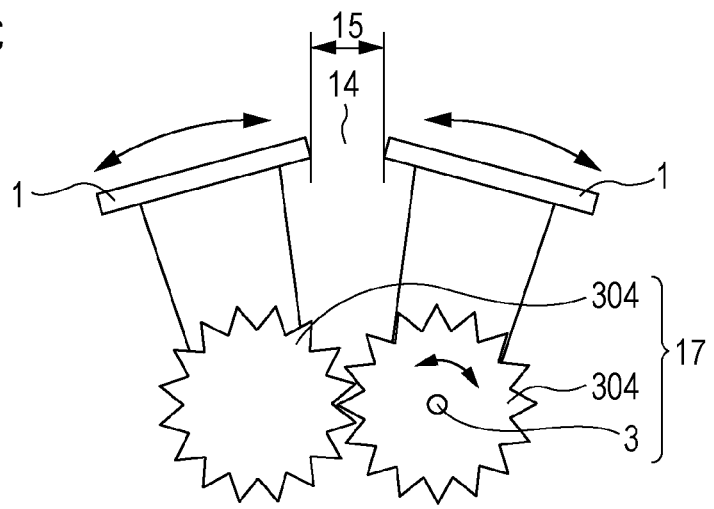

The opening width-adjusting mechanism 17 may instead be structured as in second to fourth embodiments illustrated in FIGS. 6A to 6C. In the second embodiment illustrated in FIG. 6A, the opening width-adjusting mechanism 17 includes an endless rotating member 302 stretched between a pair of pulleys 301. The endless rotating member 302 is wrapped around the pair of pulleys 301 that are spaced from each other. The endless rotating member 302 has a pair of stretched regions which moves in opposite direction between a pair of pulleys 301. Each of the pair of limiting blades 1 is connected to each of the pair of stretched regions facing each other respectively. One of the pulleys 301 is attached to the opening width-adjusting shaft 3. When the opening width-adjusting shaft 3 is rotated, the pair of pulleys 301 rotate in the same direction, so that the endless rotating member 302 is rotated in this same direction. When the opening width-adjusting shaft 3 is rotated counterclockwise (anticlockwise) in FIG. 6A, the limiting blades 1 move toward each other. When the opening width-adjusting shaft 3 is rotated clockwise in FIG. 6A, the limiting blades 1 move away from each other. In the third embodiment illustrated in FIG. 6B, the opening width-adjusting mechanism 17 includes a screw member including end portions having threads formed in opposite helical directions. In this embodiment, the each of the pair of limiting blades 1 is connected to the endless rotating member 302 at different sides of the endless rotating member 302 with the center point 16 positioned between the pulleys 301 respectively, so that an adjustable range of the width between the pair of limiting blades 1 is maximized.

The opening-width adjusting mechanism 17 of this embodiment includes a rod-shaped screw 25 with the opening width-adjusting shaft 3 coupled to the screw 25. The opening-width adjusting shaft 3 is mechanically coupled to the screw 25 with a pinion gear 27. The opening width-adjusting shaft 3 extends through the center of the pinion gear 27. The rod-shaped screw 25 has threads formed in opposite directions on either side of a reversal region 26 provided at the center of the rod-shaped screw 25 in the longitudinal direction. The screw 25 is inserted through a pair of through-nuts 303, one of which is disposed between one end of the screw 25 and the reversal region 26, and the other between the other end of the screw 25 and the reversal region 26 so that the through-nuts are engaged with the rod-shaped screw at positions with threads going in opposite directions so that rotation of the rod-shaped screw causes the through-nuts to move in opposite directions along the rod-shaped screw. The two limiting blades 1 are attached to respective through-nuts 303. The through-nuts 303 are arranged so that they cannot rotate around the central axis of the screw 25, but can move in the longitudinal direction along the screw 25. When the opening width-adjusting shaft 3 is rotated around the central axis thereof, the rod-shaped screw 25 rotates so that the through-nuts (including the limiting blade holders) 303 move toward or away from each other. In this embodiment, the pair of through-nuts (and the limiting blade holders) 303 can be moved in anti-parallel directions with respect to each other by rotation of the opening width-adjusting shaft 3. A modification of the opening-width adjusting mechanism 17 in which the rod-shaped screw 25 and the opening-width adjusting shaft 3 are coaxially arranged and are connected or combined together is also included in the embodiments of the present invention.

In the embodiments of the present invention, "movement of the limiting blades" means a movement in a direction that crosses the normal to the principal plane of the limiting blades as shown in the figures so far described. In the movement mechanisms according to embodiments illustrated in FIGS. 6A and 6B, the limiting blades are moved in directions perpendicular to the normal to the principal plane. In these cases, this enables a small size of the mechanism for adjusting the irradiation field. In the embodiments of the present invention, the limiting blades may either move linearly while the principal surfaces thereof are kept parallel to an imaginary plane, or along curved surfaces while the principal surfaces thereof are kept in contact with imaginary curved surfaces. The imaginary curved surfaces may be surfaces of spheroids, cylinders, or spheres.

In the fourth embodiment illustrated in FIG. 6C, the limiting blades move along curved surfaces. The mechanism illustrated in FIG. 6C includes a pair of gears 304 that mesh with each other and the opening-width adjusting shaft 3 is connected to a rotating shaft of one of the gears 304. The two limiting blades 1 are attached to respective gears 304. When the opening width-adjusting shaft 3 is rotated around its central axis, the pair of gears 304 rotate in opposite directions. Accordingly, the limiting blades 1 move toward or away from each other in a curved plane.

An X-ray radiography system 208 according to an embodiment of the present invention will now be described with reference to FIG. 7. The X-ray radiography system 208 according to the embodiment of the present invention includes the above-described X-ray-generating unit 200, an X-ray detection device 201 that detects the X-rays that have passed through a subject 204, a system controller 202, and a display device 203.

The system controller 202 controls the X-ray-generating unit 200 and the X-ray detection device 201 in association with each other. The drive circuit 103 outputs various control signals to the X-ray tube 102 under the control of the system controller 202. The state of X-ray emission from the X-ray-generating unit 200 is controlled by the control signals. An X-ray flux 20 emitted from the X-ray-generating unit 200 passes through the subject 204 and is detected by a detector 206. The angle of radiation of the X-ray flux 20 is determined by the irradiation field limiting apparatus 300 included in the X-ray-generating unit 200. The X-ray flux 20 forms an X-ray irradiation field 209 on a detection surface of the detector 206. The detector 206 converts the detected X-rays into an image signal, and outputs the image signal to a signal processor 205. The signal processor 205 performs predetermined signal processing on the image signal under the control of the system controller 202, and outputs the processed image signal to the system controller 202. The system controller 202 outputs a display signal to the display device 203 on the basis of the processed image signal. The display device 203 displays an image in response to the display signal. The display device 203 displays the image based on the display signal on a screen as a radiographic image of the subject 204. The X-ray-generating unit 200 and the X-ray radiography system 208 according to the embodiment of the present invention can be used as an X-ray-generating unit and an X-ray radiography system, respectively. The X-ray radiography system 208 may be used for non-destructive inspection of industrial products or pathological diagnosis for humans or other animals.

Further Embodiments

As illustrated in FIGS. 1 to 5 and discussed earlier, a pair of opening width-adjusting rack gears 2 holding respective limiting blades 1 is disposed in an inner casing 9 in a movable manner, and is combined with an opening width-adjusting pinion 4. An opening width-adjusting shaft 3, which is used to rotate the opening width-adjusting pinion 4, is arranged so as to extend through a through-hole in an opening center-adjusting pinion 7 and through a through-hole in the inner casing 9 and to project to the outside of an enclosure 11, and is connected to an adjusting knob (not shown). The inner casing 9 is held by the enclosure 11 in a movable manner. Thus, a limiting-blade unit 5 is obtained, in which the pair of limiting blades 1 and the opening-width adjusting mechanism 17 that moves the pair of limiting blades 1 are assembled together in an integrally movable manner.

The opening center-adjusting pinion 7 is engaged with an opening center-adjusting rack gear 8 formed on the edge of a guide slot 10 formed in the enclosure 11. An opening center-adjusting shaft 6 is disposed around the opening width-adjusting shaft 3 coaxially with the opening width-adjusting shaft 3. An inner end of the opening center-adjusting shaft 6 is fixed to a through-hole in the opening-center adjusting pinion 7, and an outer end thereof is connected to an adjusting knob (not shown) disposed outside the enclosure 11. Thus, an opening-center adjusting mechanism 18 for moving the limiting-blade unit 5 is obtained.

According to embodiments hereinbefore described, two limiting-blade units 5 are arranged such that the directions of the gaps between the respective pairs of limiting blades 1 are orthogonal to each other. Thus, a rectangular opening is defined and a rectangular X-ray irradiation field is formed. The limiting-blade units 5 are provided with respective opening center-adjusting mechanisms 18, and are both movable. The total weight of the thus assembled irradiation field limiting apparatus 300 is of the order of 1 kg.

The diameter of each opening width-adjusting pinion 4 is 6 mm, and the diameter of each opening center-adjusting pinion 7 is 10 mm. When each opening width-adjusting pinion 4 is rotated by one revolution, the corresponding pair of limiting blades 1 are moved by about 20 mm, which allows the pair of limiting blades 1 to be fully opened or closed. When each opening center-adjusting pinion 7 is rotated by one-third of one revolution, the corresponding limiting-blade unit 5 is moved by about 10 mm, which is the movable range of the limiting-blade unit 5. When each opening width-adjusting pinion 4 and the corresponding opening center-adjusting pinion 7 are rotated by the same amount, the amount of movement of the corresponding pair of limiting blades 1 is two-thirds the amount of movement of the corresponding limiting-blade unit 5. Accordingly, the operator is able smoothly to adjust the pair of limiting blades 1 by operating the adjusting knobs.

The irradiation field-limiting apparatus 300 is attached to the X-ray-generating apparatus 100 including a transmissive X-ray tube. Thus, an X-ray-generating unit 200 is produced as a part of the X-ray radiography system 208 illustrated in FIG. 7. The weight of the X-ray-generating unit 200 is about 10 kg. When the irradiation field-limiting apparatus 300 is manually operated, the operator is able to adjust the size and center position of the X-ray irradiation field by moving his or her hand and fingers only by a small amount. In addition, vibrations that tend to occur immediately after the adjustment of the center position of the X-ray irradiation field hardly occur, and a high-quality image is obtained. In addition, since the guide slot 10 is covered by the inner casing 9, leakage of the X-rays is sufficiently suppressed so as to meet the specifications. Furthermore, even when the center of the X-ray irradiation field is moved, the heel effect does not occur and a high-quality image is obtained with a uniform dose distribution.

According to an embodiment of the present invention, the position of the X-ray irradiation field can be moved by rotating the opening center-adjusting shaft and moving the limiting blades. In other words, the limiting-blade unit, which is lighter than the heavy X-ray-generating apparatus, is moved to adjust the position of the X-ray irradiation field. Therefore, the displacement of the center of gravity is small, and the risk of image blurring can be reduced even when the present invention is applied to a portable X-ray-generating apparatus including a light support member.

Since the above-described position adjustment of the X-ray irradiation field is performed by moving the entire limiting-blade unit, the size of the X-ray irradiation field is hardly affected. In addition, since the opening width-adjusting shaft 3 for adjusting the size of the X-ray irradiation field and the opening center-adjusting shaft 6 for adjusting the position of the X-ray irradiation field have the same rotation axis, the operating positions thereof are close to each other. For this reason, the ease of operation can be increased, and the adjustments can be performed quickly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-147312 filed Jul. 16, 2013 and No. 2014-117279 filed Jun. 6, 2014, which are hereby incorporated by reference herein in their entirety.

What is claimed is:
1. An irradiation field-limiting apparatus for limiting an irradiation field, the irradiation field-limiting apparatus comprising:

a pair of first limiting blades defining a width of an opening through which radiation is to pass;

a first opening width-adjusting mechanism including a first opening width-adjusting shaft operable to adjust the width of the opening by moving the pair of first limiting blades toward or away from each other; and a first opening center-adjusting mechanism including a first opening center-adjusting shaft operable to adjust a center position of the opening by moving the pair of first limiting blades in a same direction, wherein the first opening width-adjusting shaft and the first opening center-adjusting shaft are coaxially arranged.

2. The irradiation field-limiting apparatus according to claim 1, wherein the pair of first limiting blades are operably connected to the first opening width-adjusting shaft, and wherein the first opening width-adjusting mechanism is operable to cause the pair of first limiting blades to move in an anti-parallel directions relative to each other by rotating the first opening width-adjusting shaft.

3. The irradiation field-limiting apparatus according to claim 1, wherein the first opening center-adjusting mechanism is operable to cause the pair of first limiting blades to move in a same direction.

4. The irradiation field-limiting apparatus according to claim 1, further comprising:

a pair of second limiting blades movable toward and away from each other in a direction that crosses a direction in which the pair of first limiting blades moves;

a second opening width-adjusting mechanism including a second opening width-adjusting shaft operable to adjust a width of the opening by moving the pair of second limiting blades toward or away from each other; and a second opening center-adjusting mechanism including a second opening center-adjusting shaft operable to adjust the center position of the opening by moving the pair of second limiting blades parallel to a plane of the opening in the direction that crosses the direction in which the pair of first limiting blades moves, wherein the second opening width-adjusting shaft and the second opening center-adjusting shaft are coaxially arranged.

5. The irradiation field-limiting apparatus according to claim 1, wherein the first opening center-adjusting shaft is disposed around the first opening width-adjusting shaft, and an outer end of the first opening width adjusting-shaft projects further away from the opening than an outer end of the first opening center-adjusting shaft.

6. The irradiation field-limiting apparatus according to claim 1, wherein the first opening width-adjusting mechanism includes:

a pair of opening width-adjusting rack gears which are each connected to respective first limiting blades and which are arranged such that gear faces of the opening width-adjusting rack gears face each other, and an opening width-adjusting pinion disposed between the opening width-adjusting rack gears.

7. The irradiation field-limiting apparatus according to claim 6, wherein the first opening width-adjusting mechanism is operable to cause the opening width-adjusting rack gears to move in anti-parallel directions relative to each other by causing the opening width-adjusting pinion to rotate in response to rotation of the first opening width-adjusting shaft.

8. The irradiation field-limiting apparatus according to claim 1, wherein the first opening width-adjusting mechanism includes:

a pair of pulleys, and an endless rotating member that is stretched around the pair of pulleys, wherein each of the pair of first limiting blades is connected to each of a pair of stretched regions of the endless rotating member facing each other respectively, one of the pair of pulleys being connected to the first opening width-adjusting shaft.

9. The irradiation field-limiting apparatus according to claim 8, wherein the first opening width-adjusting mechanism is operable to cause the pair of first limiting blades to move in anti-parallel directions by causing the pair of pulleys to rotate in the same direction in response to rotation of the first opening width-adjusting shaft and causing the endless rotating member to rotate.

10. The irradiation field-limiting apparatus according to claim 1, wherein the first opening width-adjusting mechanism includes:

a pair of through-nuts to which the respective first limiting blades are connected, and a rod-shaped screw including a first portion with a helical thread in a first direction and a second portion with a helical thread in a second direction reversed with respect to the first direction, wherein the rod-shaped screw is connected to the first opening width-adjusting shaft, and wherein one of the through-nuts is engaged with the first portion of the rod-shaped screw, and the other of the through-nuts is engaged with the second portion of the rod-shaped screw.

11. The irradiation field-limiting apparatus according to claim 10, wherein the first opening width-adjusting mechanism is operable to cause the pair of first limiting blades (1) to move toward or away from each other by rotating the first opening width-adjusting shaft and rotating the rod-shaped screw.

12. The irradiation field-limiting apparatus according to claim 1, wherein the first opening width-adjusting mechanism includes:

a pair of gears to which respective first limiting blades are connected and which mesh with each other, and wherein one of the pair of gears is operably connected to the first opening width-adjusting shaft.

13. The irradiation field-limiting apparatus according to claim 12, wherein the first opening width-adjusting mechanism is operable to cause the pair of first limiting blades to move in anti-parallel directions relative to each other by rotating the first opening width-adjusting shaft and thus rotating the pair of gears.

14. The irradiation field-limiting apparatus according to claim 1, wherein the first opening center-adjusting mechanism includes:

an opening center-adjusting pinion including an inner end portion that is operably connected to the pair of first limiting blades, and an opening center-adjusting rack gear that meshes with the opening center-adjusting pinion, wherein the opening center-adjusting pinion is operably connected to the first opening center-adjusting shaft.

15. The irradiation field-limiting apparatus according to claim 14, wherein the opening center-adjusting mechanism is operable to cause the pair of first limiting blades to move in a same direction by causing the opening center-adjusting pinion to rotate and move along the opening center-adjusting rack gear in response to rotation of the opening center-adjusting shaft.

16. An X-ray-generating unit comprising:

an X-ray-generating apparatus having an emission window out of which X-rays are emitted; and the irradiation field-limiting apparatus according to claim 1, wherein the irradiation field-limiting apparatus is arranged on the outside of the emission window.

17. The X-ray-generating unit according to claim 16, further comprising:

a reference projection device for displaying a simulation of the X-ray irradiation field limited by the irradiation field-limiting apparatus with visible light.

18. The X-ray-generating unit according to claim 16, wherein the X-ray-generating apparatus includes a transmissive X-ray tube.

19. An X-ray radiography system comprising:

the x-ray-generating unit according to claim 16;

an X-ray detection device for detecting an X-ray flux that has been emitted from the X-ray-generating unit and has passed through a subject; and a controller for controlling the X-ray-generating unit and the X-ray detection device in association with each other.

* * * * *